Jan. 16, 1968    D. SATAS    3,364,063
PORUS PRESSURE-SENSITIVE ADHESIVE TAPES
Filed July 20, 1964
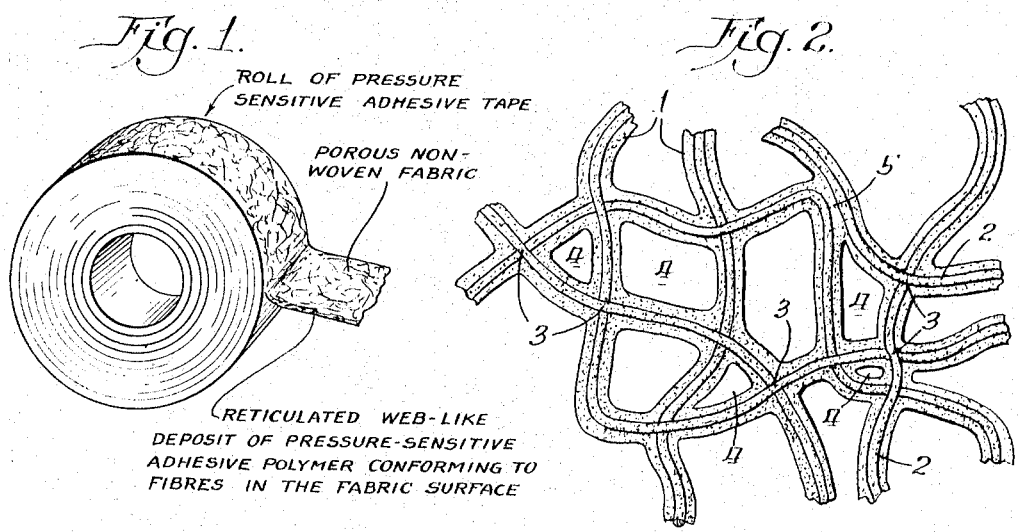
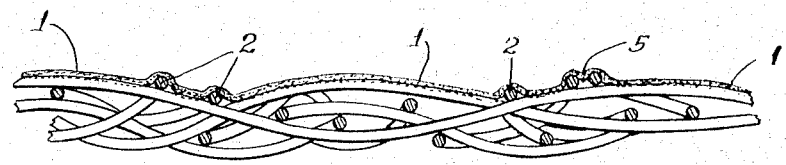
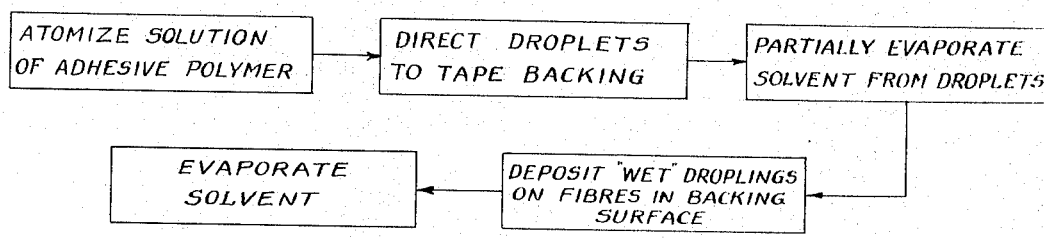
Inventor
Donalas Satas

United States Patent Office 3,364,063
Patented Jan. 16, 1968

3,364,063
POROUS PRESSURE-SENSITIVE ADHESIVE TAPES
Donatas Satas, Palatine, Ill., assignor to The Kendall Company, Boston, Mass., a corporation of Massachusetts
Filed July 20, 1964, Ser. No. 383,979
15 Claims. (Cl. 117—98)

ABSTRACT OF THE DISCLOSURE

Porous pressure-sensitive adhesive tapes in which the backing is a non-woven fabric and the adhesive is a pressure-sensitive adhesive polymer. The adhesive polymer is applied as a coating upon the fibers of the fabric exposed at the surface thereof. Also, a spray process useful in manufacture of porous pressure-sensitive adhesive tapes wherein a solution of an adhesive polymer is atomized into droplet form and the droplets directed upon the fibers in the surface of a fabric tape backing.

---

This invention relates to porous pressure-sensitive adhesive tapes and a method of making the same.

A demand for porous adhesive tape exists in that field of use in which the tape is applied to the body, such as in the case of surgical adhesive tape and athletic strapping tape. The demand is created by the problem of skin maceration which oftentimes occurs in the area of the skin covered by the tape. Maceration of the skin is that condition of skin characterized by a "dead-white" or blanched color, and by wrinkling and softening of the skin. In particularly severe cases the skin appears to become soggy and may appear to be swollen or puffed. Peel removal of the tape in severe cases of maceration can be painful and has been known to result in tearing and removal of the macerated skin with the tape. Skin maceration in these instances has been attributed to the inability of the skin to eliminate water or other body fluids in the skin occlusively covered by the adhesive tape.

The principal efforts in the solution of this problem have been in the direction of making the tape porous for the quite obvious purpose of ventilating the skin covered by the tape. Reference to prior art efforts will show that the adhesive coponent has presented the biggest obstacles in the path to adhesive tapes that are highly porous but yet satisfy other performance characteristics necessary for practical adhesive tapes. The known tapes marketed as porous or "breathable" tapes (i.e., permit the skin to "breath") are similar to conventional tapes in so far as the tapes are essentially two-ply laminates of a backing sheet and, laminated thereto, a continuous matrix-like adhesive layer having openings therein. The openings in the adhesive layer (and the backing if necessary) are created after forming a continuous adhesive film on the backing. In these instances the adhesive surface is essentially a perforated film in which the matrix portion thereof provides a continuous occlusive covering in contact with the skin when in use. In the case where the backing is a naturally porous sheet such as a fabric (either woven or nonwoven), matrix portions of the film bridge or span the backing pores. It is practically impossible to mechanically perforate all of these adhesive matrix portions which bridge interstices in highly porous woven or nonwoven fabrics having fiber counts or densities high enough to also satisfy the protective covering function of surgical tapes. Complete blocking of the interstices by these bridging matrix portions may be reduced by creating one or more openings therein by other than mechanical means. In such a structure the adhesive is still continuous and film-like, portions of which are unsupported and not in contact with the fibrous elements of the backing.

Other prior art proposals to make porous adhesive tapes include pattern printing of the adhesive and spray forming of adhesive filaments upon a porous backing. Tapes made in accordance with these proposals have suffered from deficiencies in holding power, mass anchorage to the backing and end flagging. Furthermore, these methods do not produce tape structures free of bridging portions of adhesive over the interstices of backings having a large number of interstices, but otherwise capable of providing a protective covering function. For this purpose the interstitial openings must be relatively small to prevent dirt particles from passing therethrough to the skin or wound area.

Tapes of the present invention are porous pressure-sensitive adhesive tapes characterized by remarkable porosity to both air and moisture vapors. The porosity of the backing of the tape before the application thereto of the adhesive is to a considerable extent unimpaired by the adhesive, even in the case of the backings having a large number of randomly spaced tiny openings therein. The remarkable porosity is achieved in accordance with this invention by means of a new and novel structure at the adhesive surface of the tape. The adhesive component of the tape is not a film. As will be described in further detail below, it is a retiform adhesive deposit in which the adhesive network may be characterized as composed of reinforced adhesive filaments in which the reinforcements are integral elements of the backing.

Referring to the drawings:

FIGURE 1 is a view in perspective of a roll of pressure-sensitive adhesive tape of this invention;

FIGURE 2 is a greatly enlarged view, schematically represented, of the fibers with the adhesive deposited thereon in the surface plane of the adhesive tape of this invention;

FIGURE 3 is a greatly enlarged cross-sectional view, schematically represented, of the tape of this invention showing the adhesive deposited on lengths of fibers in a surface of the nonwoven fabric backing; and FIGURE 4 is a flow sheet showing the process of the invention.

The backing of the adhesive tape of this invention is a porous nonwoven fabric. Nonwoven fabric, as now well recognized, is composed of an intermingled arrangement of fibers heterogeneously interlocked or coalesced at cross-over points to form a sheet having structural integrity and resistance of physical disruptive forces. The fibers of the fabric are preferably textile length fibers usually ranging from ½" to 1½" in length. The fibers are assembled into a web and subsequently subjected to a bonding treatment. The web is initially made is a relatively loose arrangement of fibers having substantially less structural integrity than the finished nonwoven fabric subsequently made therefrom. As understood in the nonwoven fabric art, no specific arrangement or organization of the fibers is necessary in the web forming step other than that to produce an intermingling or interlacing of fibers that results in a structurally integral sheet after the bonding treatment. The degree of orientation or alignment of the fibers may vary considerably depending upon the technique employed in assembling the fibers in web form and the amount of subsequent drafting of the web.

The bonding of the web, or a plurality of webs laid one upon the other as a multi-ply layer, to form the textile sheet-like nonwoven structure may be accomplished by any of several conventional nonwoven fabric bonding methods. The term "bonding" as used to describe the unification of the mass of randomly and heterogeneously arranged fibers includes bonding by means of an additive binder substance or by binder fibers as well as by frictional interlocking of the fibers. In the preferred embodiment in which bonding is accomplished by means of an additive binder, the binder may bond fibers to other fibers by bridging at regions of close proximity of fibers to other fibers, such as at their cross-over points. Thus, the fibers at these crossover points may be embedded in the binder material, the additive binder serving as a connecting link at these points between the fibers. Where the fibers or some portion thereof in the web are themselves binder fibers, adhesive bonding may be obtained under appropriate processing conditions by embedment of non-binder fibers in binder fibers or by fusion of binder fibers to binder fibers at cross-over points of the highly interlaced fibers. In the other aforementioned type of nonwoven bonding method, irregular kinks, twists, bends and curls may be artificially induced in cotton fibers in an assembled web to produce a nonwoven fabric primarily dependent for its integrity and coherency upon frictional interlocking resulting from the induced configurational changes in the fibers. In any case, the bonding treatment is controlled so that the identity of individual fibers in at least one of the fabric surfaces is essentially maintained in the finished nonwoven fabric sheet for use in the present tapes.

In conventionally produced, at least in commercially available porous nonwoven fabrics, portions of individual fibers exist in several different planes, taken both horizontally in or transversely to the surface of the nonwoven fabric sheet. For example, an individual fiber may lie partly in the surface plane of the sheet, possibly looping over on itself, dip down beneath the surface plane crossing under portions of other fibers in the surface plane, and proceed for a portion of its length in a plane a fiber diameter or several fiber diameters beneath the surface plane. In this manner the spaces between fibers are intersected with numerous other fibers, thereby providing numerous smaller interstitial paths from a space between fibers in one surface of the fabric to the opposite surface. Thus, the array of interlaced fiber lengths in the surface plane and in parallel planes beneath the surface plane of the fabric provide a retriculated web-like structure. The net effect is a fabric highly porous to the passage of air, other gases, vapors and liquids, but relatively impermeable to solid particles.

The reticulated web-like surface structure provided by the nonwoven fabric is essential for the purpose of this invention. The portions of the fabric in contact with the skin when placed thereon are the exposed surfaces of the fiber lengths in a surface plane of the fabric and, when pressed into conforming contact with the skin, at least some portions of the fiber lengths exposed through the spaces between the surface fibers and in immediately adjacent planes thereto. Although providing a protective cover over the skin, the skin can be substantially ventilated by passage of vapors and gases from both sides of the fabric. The area of contact corresponds in configuration with the reticulated web-like structure of the fabric surface, providing numerous areas of no direct contact corresponding generally with the numerous interstitial openings in the surface of the fabric.

In accordence with this invention a pressure-sensitive adhesive is deposited primarily in the form of a coating 1 on lengths 2 of fibers exposed at a surface of the fabric, as depicted in FIGURES 2 and 3. The coating on the fiber conforms substantially to the surface of the fiber exposed to the adhesive application. The coating may extend at least partially around the circumferential surface of the fiber, thereby more firmly anchoring the adhesive coating to the fiber. The coating on individual fibers are substantially separate from and free of contact with each other along the intermediate portions of the fibers between cross-over points. Cross-over points of fibers in the surface of the fabric are designated in FIGURE 2 by the numeral 3. The numeral 4 designates the opening in the surface of the adhesive-side of the tape defined by the adhesive coated cross-over points 4 and the lengths of fibers intermediate these points. At fiber cross-over points and along contiguously adjacent exposed fibers the adhesive coatings may merge or coalesce, such as shown at 5, into a coating thicker than the coating on other portions of the fibers but, surprisingly, not to an extent to substantially impair the breathable porosity of the fabric itself in tapes made therefrom with amounts of adhesive even in excess of that employed for tapes suitable for use as a surgical pressure-sensitive adhesive tape. The adhesive coated fibers thus provide a retiform adhesive surface on the fabric wherein the configuration of the adhesive network corresponds substantially to the reticulated web-like structure presented by the the fibers of the fabric exposed at one surface thereof prior to the deposition of the adhesive thereon.

Adhesive compositions successfully employed to obtain this new and novel structural relationship between adhesive surface and backing consist essentially of "single-component" pressure-sensitive adhesives. These adhesives have been so named because they are based on elastomeric polymers which per se are pressure-sensitive. These polymers are inherently tacky, cohesive and adhesive. Additives need not be added to these polymers to obtain compositions that are pressure-sensitive (as tackifiers must be added to rubber, for example, to obtain satisfactory adhesive properties), although other materials including tackifiers preferably in small amounts may be added thereto for modification of the particular balance of pressure-sensitive adhesive properties inherent in the polymer, or for other purposes, such as coloring of the adhesive. A class of polymers particularly suitable for this purpose in that it provides a considerable range of polymers of various degrees of pressure-sensitive adhesive properties is a class of amic acid/acrylate polymers in which the amic acid comonomer, for example, is a mixture of N-branched alkyl maleamic acids wherein the alkyl groups average from about 10 to 24 carbon atoms and the acrylate comonomer is a $C_1$ to $C_{12}$ alkyl acrylate or methacrylate. Other per se pressure-sensitive adhesive polymers are elastomeric homoacrylate polymers of $C_4$ to $C_{12}$ alkyl acrylates, elastomeric copolymers of $C_4$ to $C_{12}$ acrylates copolymerized with an ethylenically unsaturated monomer such as acrylonitrile, itaconic acid, glycol diacrylates, vinyl acetate or acrylic acid, and elastomeric silicone polymers.

Reference to the flow sheet diagram of FIG. 4 will facilitate an understanding of the following description of the process by which the present tapes may be made. The new and novel fiber reinforced reticulated web-like adhesive layer on a nonwoven fabric tape is obtained by a spray process in which a solution or dispersion of the adhesive polymer in a volatile solvent is atomized into fine, nonfibrous, droplet form and deposited on the fabric before complete evaporation of the solvent therefrom. It has been found with proper spraying conditions that the droplets deposit on and coat the exposed portions of the fibers without building up into film-like or membrane-like portions spanning the interstices. This result has been obtained when the droplets at the time of deposit on the fabric have a solids content of from about 45% to 65%. Strike-through of adhesive tends to occur when the solids content of the droplets is less than 45% at the time of contact with the fabric. If the solids content at the time of deposit is much higher than 65% poor anchorage of the adhesive to the fibers results. At the higher solids content the adhesive polymer deposits as globules or coagulated lumps on the fibers of the fabric and in the spaces between the fibers rather than selectively depositing and coating the exposed lengths of fibers of the fabric. The reason for the selective deposition of the adhesive polymer on the fibers in accordance with this invention is not clearly understood. It is suggested that air turbulence, at the surface of the porous fabric may be such that the fine spray droplets are swirled about at the fabric surface and in the surface interstices until contact is made with a fiber surface. Since the adhesive is only partially dried in droplet form at the time of contact it is forced into coating contact with the fibers and coalesces with adjacent droplets deposited on the fiber. This suggestion is offered only as a theoretical explanation of the process and to which the scope of this invention is not to be restricted. The suggestion, however, is based on an intersecting observation made when a single ply of an open weave 16 x 16 gauge was sprayed with an adhesive polymer solution under the same condition employed for producing the nonwoven fabric types of this invention. The threads of the gauze fabric were coated with the adhesive only on the surfaces exposed to the spray. The adhesive solution penetrated beneath the surface of the threads, but did not strike through. The exposed areas and thread covered areas of the impermeable carrier sheet upon which the gauze was supported when sprayed were surprisingly, not coated with the adhesive. In choosing suitable conditions to produce the nonwoven fabric tapes of this invention, it is suggested that the operator may first determine by trial-and-error adjustment of the various interrelated spray conditions the balance thereof that will produce the above described result when spraying the adhesive solution upon a supported 16 x 16 gauze fabric. Generally, these conditions will be within or near the optimum range of operating conditions for producing the porous, nonwoven fabric tapes of this invention.

An advantageous feature of the process is that standard paint spraying equipment may be employed; special spraying apparatus is not necessary. Variables under the control of the operator of the equipment are the solids content of the starting solution, the rate of feed of the solution through the spray nozzle, the volatility of the solvent, the air velocity and the distance from the spray nozzle to the fabric (target distance). To varying degrees these are interrelated variables that may be balanced into adjustment to produce the retiform adhesive deposit on the nonwoven fabric as previously described. The solids content of the starting solution should be less than about 45% and preferably less than about 30%. Finer atomization is more easily obtained with the less viscous, lower solids content solutions. A generally suitable range of solids content for the starting solution is from about 10% to 30% when employing low-boiling point solvents and for reasonably practical target distances. As explained above, the adhesive droplets must be wet at the time of contact with the fabric. The aforementioned range of about 45% to 65% solids content of the spray deposit at the time of contact was determined by weight comparisons of the nonwoven fabrics prior to being sprayed, immediately after being sprayed, and after air drying the sprayed fabric to evaporate residual solvent. The amount of the residual solvent in the fabric at the time of contact with the fabric decreased with increasing distance to the target. Accordingly, adjustment of target distance offers a convenient main control over the process to produce the adhesive tape structures of the invention. Thus, rather than increase the solids content of the starting solution to reduce residual solvent in the deposit at time of contact with the fabric, possibly producing a coarser spray, it will usually be found simpler to increase the target distance. Conversely, it is usually more expedient to decrease target distance to obtain a "wetter" adhesive deposit than to decrease the solids content of the starting solution. Reasonably practical target distances range from about 5″ to 30″, preferably from about 10″ to 20″. In production equipment and for continuous production runs, the target distances may be fixed and minor adjustments in feed rate of the starting solution to the spray nozzles may be adjusted to compensate for fluctuations in the pressure of the air fed to the nozzle or for obstruction of the nozzle by adhesive particles, for example.

*Example*

The backing of this tape was a nonwoven fabric consisting of, by weight 74.5% textile length, bright crimped, 1.5 denier viscose rayon fibers and 25.5% of a binder and finish agent. The binder, with which the carded webs of rayon fibers were saturated, was an anionic acrylic latex binder (sold by B. F. Goodrich Chemical Company under the trademark Hycar 2671) containing an amino cross-linking agent. The finish was a mixture of butadiene-styrene rubber and starch, pad applied to both surfaces of the additive binder impregnated fabric. The weight of the fiber was 32 to 38 grams per square yard of fabric. The fabric was from 3 to 5 mils in thickness.

Typical of such fabrics, the nonwoven fabric was a reticulated web of randomly interlaced and intermingled fibers with no means visibly apparent to the unassisted eye of being held together in sheet form other than by entanglement of the fibers. Also, the fabric was extremely porous, containing innumerable and heterogeneously spaced openings therein. Indeed, the fabric was "breathably" porous in that the fabric caused no noticeable impairment in breathing through the mouth when placed in covering contact over the mouth. Although containing a large number of passageways for the transmission of gases and watery liquids, the passageways were so fine that the fabric diffused light passing therethrough so that objects beyond the fabric could not be clearly distinguished in detail unless the fabric were placed directly in contact with the object.

The pressure-sensitive adhesive polymer spray-deposited on this nonwoven fabric was a polymer prepared by copolymerizing a mixture of N-branched alkyl maleamic acids with ethyl acrylate and 2-ethylhexyl acrylate added to the polymerization charge in the mol ratio 1:1:4, respectively. The maleamic acids were prepared by amidating one mole of maleic anhydride with one mol of a mixture of N-t-branched alkyl primary amines marketed as Primene 81–R by the Rohm and Haas Company. This mixture is reported to consist principally (about 90%) of t-$C_{11}$ to t-$C_{14}$ branched alkyl amines averaging about 12 carbon atoms in the alkyl groups. The neutral equivalent of this mixture of amines is 191. The molar weight of the mixture of the amic acids so prepared was determined on the basis of the molecular weight a $C_{12}$ maleamic acid. The polymer was prepared in aqueous emulsion employing a redox catalyst system (potassium persulfate and sodium bisulfite). Polymerization proceeded readily at temperatures within the range of 45° to 70° C.

The dried, coagulated polymer after separation from the emulsion was dispersed in a solvent mixture of about 300 parts toluene, 100 parts n-hexane and 50 parts isopropyl alcohol all per 100 parts of the polymer on a weight basis. This provided a starting spray solution of about 18% solids content. The nonwoven fabric to be sprayed was placed on a paper carrier sheet. The spray nozzle was placed at a distance of about 10″ from the surface of the fabric to direct the spray in a path generally perpendicular thereto. The orifice for the solution in the nozzle had a cross-sectional area of about $5 \times 10^{-3}$ square inch. The cross-sectional area of the air orifice was about 0.13 square inch. The starting spray solution was delivered to the nozzle at a rate of 5 pounds per hour and the air at a gauge pressure of 60 pounds per square inch. The adhesive solution was sprayed upon the nonwoven fabric in an amount sufficient to provide a dried adhesive deposit thereon of about 22 grams per square yard of fabric. Residual solvent was removed from the sprayed tape by air drying.

Examination of the porous tape under magnification revealed that the adhesive was deposited on the fibers as a coating extending partially but not completely around the surface of the fibers, providing a retiform adhesive surface on the fabric wherein the configuration of the adhesive network corresponded substantially to the reticulated web-like surface presented by the fibers exposed at the fabric surface prior to the deposition of the adhesive. The adhesive coated the top surface of the exposed fibers and, particularly in the case of the fibers in the surface plane of the fabric, extended around to the side surfaces of the fibers. Impregnation of the fiber to the extent that the adhesive would strike through to the under-surface of the fiber may be avoided by controlling the spray conditions, for example, the "wetness" of the spray droplets as previously described. This is to be avoided in the preferred thin, compacted nonwoven fabric backings, such as in the backing of this example wherein lengths of fibers exposed at the sprayed surface of the fabric may also be exposed at the back side of the fabric or even in the surface plane of the back side of the fabric. The adhesive on the under-surface of the fiber being unavailable for adhesion purposes is an unnecessary waste of adhesive. However, the concept of this invention does include "double-faced" adhesive tapes in which the adhesive surface on each side of the nonwoven fabric is a retiform adhesive surface as previously described. The preferred method of making such a tape is to spray one side of the fabric and then the other. The adhesive coating on the fibers exposed to the spray may extend partially or completely around the surfaces of all or a portion of such fibers, depending upon the fiber density of the nonwoven fabric, the thickness of the fabric, the adhesive weight deposited on each side of the fabric, and, of course, the spraying conditions.

The adhesive coated fibers of the fabric are, of course, thicker than the fibers prior to the spray deposition of the adhesive. Although for this reason the interstices between fibers of the tape are accordingly smaller, the tape was remarkably porous. In fact, when taped over one's mouth, it was as easy to breathe through a single strip of the tape as through the fabric itself prior to the spray application of the adhesive thereto. To further examine the breathable porosity of the tape made in accordance with this example with a dry weight adhesive coating as described, several strips of tape were applied over the mouth one upon the other in adhesive contact with the immediately underlying strip. Slight puffing and indrawing of the cheeks occurred when three strips were so applied across the mouth and air was inhaled and exhaled therethrough. Breathing became more difficult when five strips were so applied to the mouth and at seven to ten strips a distinct and conscious effort was required to inhale and exhale through the tapes.

For purposes of comparison, a commercially available porous nonwoven fabric adhesive tape was subjected to the same breathability tests. This tape is described as a breathably porous tape and has been represented by the manufacturer as being made in accordance with the teachings of U.S. Patent 3,121,021, issued Feb. 11, 1964. As taught therein, and as is apparent from examination under magnification, the adhesive is a porous but continuous membrane covering the porous nonwoven fabric backing. The adhesive is first applied to the backing in the form of a continuous adhesive coating after which pore-like apertures are caused to develop in the portions of the coating bridging interstices in the fabric. A single strip of this tape when taped across the mouth, as described above, required a distinct and conscious breathing effort as indicated by considerable puffing-out and indrawing of the cheeks when exhaling and inhaling. Three to four strips when so applied produced a feeling of a shortage of breath and ten strips left the test subject gasping for breath upon removal of the tape only a few minutes after taping over the mouth.

The tapes were tested for resistance to air flow as a measurement of porosity on a standard Gurley Densometer (W. & L. E. Gurley Co.) using a five-ounce closed top cylinder. This apparatus was used to measure the time required for 200 cc. of air to pass through 0.1 square inch area of tape. In accordance with standard procedure, the test specimen was positioned over the air escape opening of the Densometer and firmly held in place. The closed top cylinder was raised to the calibrated 300 cc. mark. The time from the moment of release of the cylinder to the time the falling cylinder passed the mark indicating the passage of 200 cc. of air was recorded. This test shall be referred to herein and in the claims as the "Gurley test."

The "A" designated tape in Table I is the tape prepared in accordance with the foregoing example. The adhesive weight of this tape was about 22 grams per square yard. The "B" tape is the aforementioned tape of U.S. Patent 3,121,021 as marketed by the manufacturer. The "backing" specimens were the nonwoven fabrics without the adhesive. The porosity of one strip of each tape was measured, as well as multiple strips thereof, one tape upon the other with the adhesive of one strip in contact with the back surface of the next adjacent strip. The values in the A and B columns are the lengths of time for the test sample to pass 200 cc. of air on the Gurley Densometer.

TABLE I

| Test Specimen | A Tape | B Tape |
| --- | --- | --- |
| Backing | 1.5-2.0 sec | 2.5-2.8 sec. |
| One Strip | 2.2-2.4 sec | 24 min. |
| Two Strips | 3.0 sec | 76 min. |
| Three Strips | 5.0 sec | 180 min. |
| Four Strips | 6.5 sec | |
| Five Strips | 8.0 sec | |
| Six Strips | 9.5 sec | |
| Seven Strips | 11.0 sec | |
| Eight Strips | 13.0 sec | |
| Nine Strips | 15.0 sec | |
| Ten Strips | 17.0 sec | |

Single and multiple strips of the present tapes one superimposed upon the other exhibit high rates of moisture vapor transmission. This is illustrated by the data in Table II. The water vapor transmission rates set forth in Table II were determined in accordance with the procedure of Government Specification PPP-T-60, revised per Amendment-3 of Sept. 6, 1960, with the exception that the opening of the test dish was ½" wide instead of 1" wide. The dimensions of the test dish were otherwise as specified in the Specification. The measured water vapor transmission rates were converted to grams of water vapor transmitted per 24 hours per 100 square inches of tape area, as set forth in the PPP-T-60 Specifications. The A and B tapes were the tapes described above for Table I.

TABLE II

| Test Specimen | A Tape | B Tape |
| --- | --- | --- |
| One Strip | 660 | 300 |
| Two Strips | 530 | 220 |

An adhesive tape was prepared in accordance with this invention having an adhesive weight of only about five grams per square yard of tape. The backing was the aforedescribed fabric. The adhesive deposited essentially as a coating on the top surface of the fibers with very little, if any, extending around on the side surface of the fibers. Comparison of the breathable porosity and the air flow resistance by the Gurley test indicates that the reduction in size of the interstices in the adhesive tape of the example made with about 22 grams of adhesive per square yard was insufficient to substantially impair the porosity of the tapes. The adhesive quality of the tape with a five-gram deposit, however, was not as good as that of the tape with the 22 grams of adhesive per square yard. Tapes having from about 20 to 50 grams of adhesive per square yard on unwoven fabrics having a fiber weight of about 30–50 grams per square yard exhibit adhesive qualities particularly satisfactory for surgical tape uses. The tapes adhere readily upon the application of slight pressure and remain in place. These tapes, and indeed tapes having as much as about 80 grams of adhesive per square yard, are breathably porous and exhibit rates of air flow of from about 2 to 3 seconds by the Gurley test. Tapes prepared having about 150 grams and about 180 grams on the aforedescribed nonwoven fabric have exhibited air flow rates of from about 25 to 28 seconds by the Gurley test. It was more difficult to breathe through these tapes than the tapes containing less than about 80 grams of adhesive per square yard. The adhesive coatings on the fibers of the 150- and 180-gram adhesive tapes were thicker than the coatings on the tapes with less than about 80 grams of adhesive. At the higher coating weights the adhesive tended to build-up on the top surfaces of the fibers, particularly upon high spots on the fabric surface.

It will be appreciated from the foregoing that the novel structural relationship between the nonwoven fabric backing and adhesive surface of the tapes of this invention provide adhesive tapes of high porosity, even at high coating weights. Preferred tapes of this invention are those in which the retiform adhesive surface on the reticulated web-like structure presented by the array of fibers in the nonwoven fabric is such that the resistance of the tape to the flow of air therethrough is no greater than twenty-five times the resistance of the nonwoven fabric itself, as measured by the Gurley test. Although porous adhesive tapes can be made with high adhesive weights, the preferred tapes are those having adhesive weights of from about 20–50 grams per square yard of tape.

It is not uncommon for tapes to be applied to a wound or bruise area of the body in overlapping or partially overlapping strips. As compared to known porous tapes, the tapes of this invention are superior for such applications, for reasons obvious from the foregoing description. The tensile strength of the nonwoven fabric backing can be increased as desired for the purpose of providing stronger tapes for strapping purposes. This can be done, for example, by inserting reinforcing strands between the webs of fibers during assembly of the webs in the process of making multi-ply nonwoven fabrics. The reinfocement may be a woven fabric (e.g., 16 x 16 gauze) or individual continuous filaments of high strength material.

While it is predicted that the tapes of this invention having a thickness of from about 3 to 6 mils will satisfy the needs for porous tapes, it should be understood that this invention is not restricted to tapes of this thickness only. Thicker, bulkier nonwovens may be converted to tapes in accordance with this invention suitable for use as a cushioning pad to serve as a protective cover over or around the surface area of the body to be protected. Obviously, tapes having adhesive and non-adhesive zones on the backing are within the scope of this invention.

The pressure-sensitive adhesive polymer employed in making the present tapes deposited as a clear, "water white," transparent coating on the fabric. The retiform adhesive surface of the tape was not immediately descernible upon casual, unaided visual inspection. The tape was similarly opaque as the fabric itself in that the details of objects beyond and spaced from the tape could not be fully delineated when attempting to view the same through the tape. When placed in adhesive contact with the object, the tape was clearly transparent. The tapes of this invention therefore are suitable for use as transparent surgical tapes and for other applications where transparency is desirable, such as in repairing torn paper sheets in books and the like.

As explained above, the surface upon which the adhesive is spray deposited must be fibrous. This does not mean that the surface must merely be a hairy or downy surface. As a fibrous surface, it must not be glossy, film-like smooth. The fibrous surface has "depth," although not necessarily apparent upon casual, unaided visual observation. The fibers in the fibrous surface substantially maintain their individual identity. As seen under magnification (e.g., 10 power) adjacent fibers are separate from each other over major portions of their lengths. As so viewed, the surface appears to be uneven in passing from fiber to fiber and over and along intersecting fibers. Under conditions of the aforedescribed process the adhesive structurally conforms to the surface upon which it is deposited. Thus, a smooth continuous adhesive film is formed when sprayed on the smooth surface of a film. When sprayed on a fibrous nonwoven fabric surface under the same spraying conditions it conforms to the fibrous surface, selectively depositing on the exposed fibers at the fabric surface to obtain the retiform structure previously described. For purposes of this application, the expression "fibers" when used in connection with the nonwoven fabric or tape made therefrom include the presence of an added binder substance and/or finish on the fibers, underneath the adhesive coating.

Porous nonwoven fabrics suitable for use in accordance with this invention may be made from a variety of fibers including, in addition to rayon fibers, cotton fibers, cellulose acetate and triacetate fibers, nylon fibers, acrylic fibers, polyester fibers, vinyl polymer and copolymer fibers, and blends thereof. Nonwoven fabrics are made from a variety of denier sizes of these and other fibers. Fabrics made with lower denier size fibers, generally from about 1.5 to 5 and preferably from about 1.5 and 3 denier fibers, having a fiber weight from about 30–50 grams per square yard are preferred for the porous surgical tapes of this invention. Fabrics made from blends of fibers of different deniers may also be employed. Examples of materials suitable for use as additive binders are polyvinylacetate, vinyl acetate:vinyl chloride copolymers, polyvinylidene chloride, vinyl acetate:ethyl acrylate copolymers, butadiene:acrylonitrile copolymers, atactic polypropylene and urea formaldehyde resins.

The invention claimed is:

1. A porous pressure-sensitive adhesive tape comprising:
   (A) a porous nonwoven fabric wherein the lengths of fibers of said fabric in a surface plane thereof are arranged in a reticulated web-like structure and wherein lengths of fibers beneath said surface plane also are arranged in a reticulated web-like structure spanning interstices between lengths of fibers at said surface plane to thereby provide interstitial paths from interstices between lengths of fibers at said surface plane through interstices between lengths of fibers beneath said surface plane to the other side of said fabric, and
   (B) a pressure-sensitive adhesive consisting essentially of a pressure-sensitive adhesive polymer, said adhesive deposited on said lengths of fibers as a coating conforming substantially to and extending partially around the circumferential surface of the fibers to provide a retiform adhesive surface on said fabric wherein the configuration of the adhesive network substantially corresponds to the reticulated web-like structure presented by the lengths of fibers of said fabric exposed at the surface thereof prior to the adhesive coating on said fibers.

2. A porous pressure-sensitive adhesive tape comprising:
   (A) a porous nonwoven fabric wherein the lengths of fibers of said fabric in a surface plane thereof are arranged in a reticulated web-like structure and wherein lengths of fibers beneath said surface plane also are arranged in a reticulated web-like structure spanning interstices between lengths of fibers at said surface plane to thereby provide interstitial paths from interstices between lengths of fibers at said surface plane through interstices between lengths of fibers beneath said surface plane to the other side of said fabric, and
   (B) a pressure-sensitive adhesive consisting essentially of a pressure-sensitive adhesive polymer, said adhesive deposited on said lengths of fibers as a coating conforming substantially to and extending partially around the circumferential surface of the fibers, the coatings on the fibers merging into contact with each other primarily only at cross-over points of said fibers, to provide a retiform adhesive surface on said fabric wherein the configuration of the adhesive network substantially corresponds to the reticulated web-like structure presented by the lengths of fibers of said fabric exposed at the surface thereof prior to the adhesive coating on said fibers.

3. A porous pressure-sensitive adhesive tape in accordance with claim 2 wherein said porous nonwoven fabric is composed of fibers having a denier of from about 1.5 to 5, the weight of the fibers of said fabric is from about 30–50 grams per square yard of fabric and the weight of said adhesive is from about 20 to 50 grams per square yard of fabric.

4. A porous pressure-sensitive adhesive tape comprising:
   (A) a porous nonwoven fabric composed of fibers having a denier of about 1.5 to 5 wherein the lengths of fibers of said fabric in a surface plane thereof are arranged in a reticulated web-like structure and wherein lengths of fibers beneath said surface plane also are arranged in a reticulated web-like structure spanning interstices between lengths of fibers at said surface plane to thereby provide interstitial paths from interstices between lengths of fibers at said surface plane through interstices between lengths of fibers beneath said surface plane to the other side of said fabric, said fabric having a fiber weight of about 30–50 grams of fibers per square yard of fabric, and
   (B) a pressure-sensitive adhesive consisting essentially of a pressure-sensitive adhesive polymer in an amount of about 20–50 grams thereof per square yard of fabric, said adhesive deposited on said lengths of fibers as a coating conforming substantially to and extending partially around the circumferential surface of the fibers, the coatings on the fibers merging into contact with each other primarily only at cross-over points of said fibers, to provide a retiform adhesive surface on said fabric wherein the configuration of the adhesive network substantially corresponds to the reticulated web-like structure presented by the lengths of fibers of said fabric exposed at the surface thereof, the resistance of the flow of air through said tape being no more than about twenty-five times greater than the resistance of said nonwoven fabric itself to the flow of air as measured by the Gurley test described herein.

5. A porous pressure-sensitive adhesive tape comprising:
   (A) a porous nonwoven fabric composed of fibers having a denier of about 1.5 to 5 wherein the lengths of fibers of said fabric in a surface plane thereof are arranged in a reticulated web-like structure and wherein lengths of fibers beneath said surface plane also are arranged in a reticulated web-like structure spanning interstices between lengths of fibers at said surface plane to thereby provide interstitial paths from interstices between lengths of fibers at said surface plane through interstices between lengths of fibers beneath said surface plane to the other side of said fabric, said fabric having a fiber weight of about 30–50 grams of fibers per square yard of fabric, and
   (B) a pressure-sensitive adhesive consisting essentially of a pressure-sensitive adhesive polymer in an amount of about 20–50 grams thereof per square yard of fabric, said adhesive deposited on said lengths of fibers as a coating conforming substantially to and extending partially around the circumferential surface of the fibers to provide a retiform adhesive surface on said fabric wherein the configuration of the adhesive network substantially corresponds to the reticulated web-like structure presented by the lengths of fibers of said fabric exposed at the surface thereof, the resistance of the flow of air through said tape being no more than about twenty-five times greater than the resistance of said nonwoven fabric itself to the flow of air as measured by the Gurley test described herein.

6. A porous pressure-sensitive adhesive tape comprising:
   (A) a porous nonwoven fabric composed of fibers having a denier of about 1.5 to 5 wherein the lengths of fibers of said fabric in a surface plane thereof are arranged in a reticulated web-like structure and wherein lengths of fibers beneath said surface plane also are arranged in a reticulated web-like structure spanning interstices between lengths of fibers at said surface plane to thereby provide interstitial paths from interstices between lengths of fibers at said surface plane through interstices between lengths of fibers beneath said surface plane to the other side of said fabric, said fabric having a fiber weight of about 30–50 grams of fibers per square yard of fabric, and
   (B) a pressure-sensitive adhesive consisting essentially of a pressure-sensitive adhesive polymer in an amount of about 20–50 grams thereof per square yard of fabric, said adhesive deposited as a coating on lengths of said fibers exposed at one side of said fabric prior to the adhesive coating to provide a retiform adhesive surface on said fabric without substantial bridging of adhesive between fibers, the tape's resistance to the flow of air therethrough being no more than about twenty-five times greater than the resistance of said nonwoven fabric itself to the flow of air as measured by the Gurley test described herein.

7. A porous pressure-sensitive adhesive tape in accordance with claim 1 wherein said adhesive polymer consists essentially of comonomeric N-alkyl maleamic acids and ester comonomers selected from the group consisting of alkyl acrylates and alkyl methacrylates.

8. A porous pressure-sensitive adhesive tape in accordance with claim 4 wherein said adhesive polymer consists essentially of comonomeric N-alkyl maleamic acids and ester comonomers selected fromt he group consisting of alkyl acrylates and alkyl methacrylates.

9. A porous pressure-sensitive adhesive tape in accordance with claim 6 wherein said adhesive polymer consists essentially of comonomeric N-alkyl maleamic acids and ester comonomers selected from the group consisting of alkyl acrylates and alkyl methacrylates.

10. A pressure-sensitive adhesive tape in accordance with claim 1 in which said porous nonwoven fabric consists essentially of fibers bonded at fiber cross-over points by means of a binder substance added thereto.

11. A pressure-sensitive adhesive tape in accordance with claim 4 in which said porous nonwoven fabric consists essentially of fibers bonded at fiber cross-over points by means of a binder substance added thereto.

12. A pressure-sensitive adhesive tape in accordance with claim 6 in which said porous nonwoven fabric consists essentially of fibers bonded at fiber cross-over points by means of a binder substance added thereto.

13. A process for producing a porous pressure-sensitive adhesive tape, comprising:
   (A) providing a porous tape backing having a fibrous surface composed of interlaced fibers in which lengths of fibers between cross-over points of interlaced fibers define interstices in said surface structure;
   (B) providing a volatile solvent solution of a pressure-sensitive adhesive polymer;
   (C) atomizing said solution of pressure-sensitive adhesive polymer;
   (D) directing the droplets of said atomized solution to said fibrous surface;
   (E) partially evaporating the solvent from said droplets during their path of travel to said fibrous surface so that the solids content of said droplets is no greater than about 65% at the time of contact with the fibers of said backing;

(F) depositing said droplets on exposed fibers of said surface while in their partially dried state to cause said droplets to coat said exposed fibers to form a retiform deposit thereof structurally conforming to the reticulated web-like surface structure of said fibrous surface.

14. A process in accordance with claim 13 wherein said backing is a porous nonwoven fabric.

15. A process in accordance with claim 13 wherein said solution of the polymer has a solids content of less than about 45% and the solids content of the droplets at the time of deposit upon the exposed fibers of said backing is from 45% to 65%.

References Cited

UNITED STATES PATENTS

| | | | |
|---|---|---|---|
| 2,358,761 | 9/1944 | Reed | 177—122 |
| 3,015,597 | 1/1962 | Lambert | 154—53.5 |
| 3,039,893 | 6/1962 | Banigan et al. | 117—122 |
| 3,113,038 | 12/1963 | Lattarulo et al. | 117—140 |
| 3,120,449 | 2/1964 | Griswold | 117—38 |
| 3,121,021 | 2/1964 | Copeland | 117—122 |
| 3,158,525 | 11/1964 | Reynolds | 161—72 |
| 3,232,819 | 2/1966 | Satas | 161—72 |

WILLIAM D. MARTIN, *Primary Examiner.*

W. D. HERRICK, *Assistant Examiner.*